United States Patent
Carney (10) Patent No.: US 6,728,768 B1
(45) Date of Patent: Apr. 27, 2004

(54) METHOD AND APPARATUS FOR IMPROVING DYNAMIC SIMPLE NETWORK MANAGEMENT PROTOCOL GETNEXT PROCESSING

(75) Inventor: Dennis Michael Carney, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,224

(22) Filed: Apr. 13, 2000

(51) Int. Cl.[7] .................. G06F 15/173; G06F 15/16; G06F 12/00
(52) U.S. Cl. .................. 709/224; 709/202; 707/200
(58) Field of Search .................. 707/200, 103 R; 709/224, 202

(56) References Cited

U.S. PATENT DOCUMENTS

| | | | |
|---|---|---|---|
| 5,557,746 A | * 9/1996 | Chen et al. | 709/202 |
| 5,561,769 A | 10/1996 | Kumar et al. | |
| 5,689,703 A | * 11/1997 | Atkinson et al. | 707/103 R |
| 5,706,508 A | * 1/1998 | Chen et al. | 707/200 |
| 5,778,377 A | * 7/1998 | Marlin et al. | 707/103 R |
| 5,802,309 A | 9/1998 | Cook et al. | |
| 5,913,037 A | 6/1999 | Spofford et al. | |
| 5,987,514 A | * 11/1999 | Rangarajan | 709/224 |
| 6,009,431 A | 12/1999 | Anger et al. | |
| 6,076,107 A | * 6/2000 | Chen et al. | 709/224 |

FOREIGN PATENT DOCUMENTS

| | | | | |
|---|---|---|---|---|
| EP | 621706 A2 | * 10/1994 | | H04L/12/24 |
| JP | 10-283287 | 10/1998 | | |

OTHER PUBLICATIONS

"Architecture for Stackable Hub Management," IBM Technical Disclosure Bulletin, vol. 38, No. 2, Feb. 1996, pp. 3–9.

* cited by examiner

Primary Examiner—David Wiley
Assistant Examiner—Michael Delgado
(74) Attorney, Agent, or Firm—Crawford Maunu PLLC (57) ABSTRACT

A method and apparatus for improving dynamic simple network management protocol GetNext processing is disclosed. The method and apparatus supports dynamic information in SNMP by building the "GetNext" list once, then caching that list for a given amount of time.

21 Claims, 5 Drawing Sheets

METHOD AND APPARATUS FOR IMPROVING DYNAMIC SIMPLE NETWORK MANAGEMENT PROTOCOL GETNEXT PROCESSING

BACKGROUND OF THE INVENTION

1. Field of the Invention.

This invention relates in general to network management, and more particularly to a method and apparatus for improving dynamic simple network management protocol GetNext processing.

2. Description of Related Art.

Data communication is the foundation upon which the information economy rests. Almost every device we use today is a computer-based system including our phones, cars, personal digital assistants, printers, desktop and portable computers, microwaves, etc. Moreover, the networking of such devices is becoming a reality in the hope that our lives will become more convenient and our leisure time will increase. For example, world-wide networks gather data about such diverse subjects as current events, the stock market, the temperature of our homes, etc. These networks evolved as independent entities without the ability, or, until recently, the need, to interconnect with one another. New technologies, generically named "internetworking", have emerged making it possible to interconnect many disparate physical networks and make them function as a coordinated unit. Thus, using internetworking technologies, a host, for example, on one network, may traverse multiple networks and communicate with another host on a different network.

In the early days of networking, as the interconnecting of networks grew, the monitoring and maintenance of these networks became more difficult. It soon became evident that a network management protocol needed to be developed. The first protocol used was the Simple Network Management Protocol (SNMP). SNMP was commonly considered to be a quickly designed interim solution to internetwork management difficulties while other, larger and better protocols were being designed. Out of these protocol designs of the 1980's emerged SNMPv2, which incorporated many of the features of the original SNMP (which is still in wide use today) as well as a few added features that addressed the original protocol's shortcomings. Today, SNMP based network management systems are widely used to locate and correct problems in a network.

Figure 1:
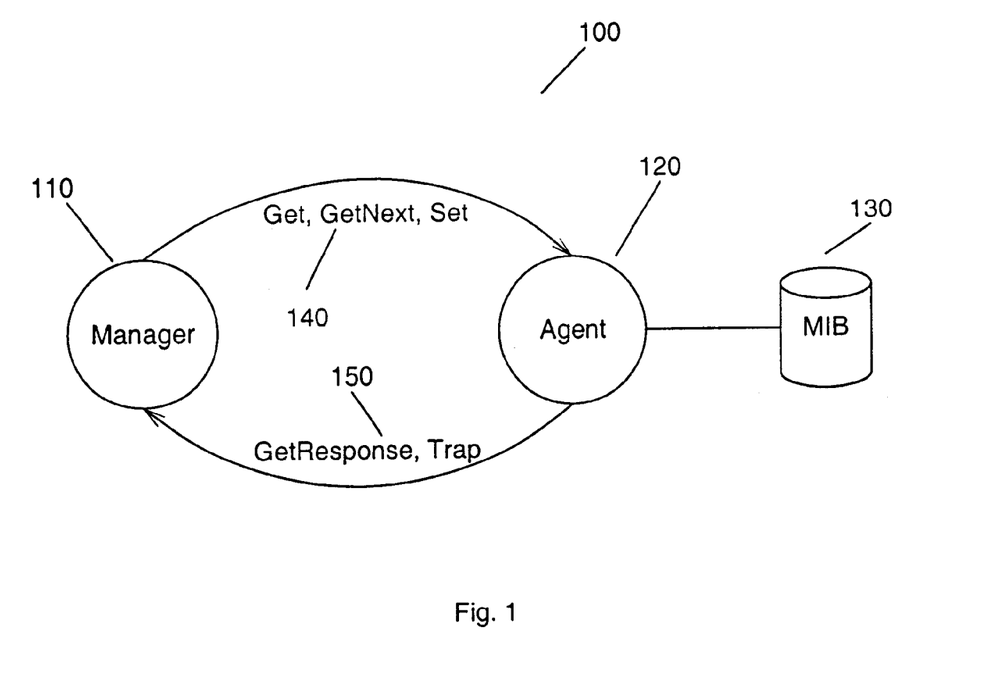
FIG. 1 illustrates block diagram of the Simple Network Management Protocol (SNMP) model.

SNMP normally operates by having one or more central manager node(s) oversee multiple agent nodes as shown in FIG. 1. As depicted, each agent node 120 supports a local, tree-structured database, called a Managed Information Base 130 (MIB) and software that allows a valid manager node 110, such as a host computer, to access information in MIB 130. Agent node 120, which may reside in any agent device such as routers, database managers, printers, etc., responds to command messages sent by manager node 110.

SNMP describes the packet layout (or protocol data unit) for messages between management agents and managing processes. The first version of SNMP, included only five possible messages. Manager Messages 140 are messages that can be sent by manager node 110 to agent node 120 and include "Get", "GetNext" and "Set." "Get" is a message that is sent to read certain locations in MIB 130. The GetNextRequest message provides an efficient method for the managing process to search tables of values. "Set" enables the manager to update variables.

Agent Messages 150 that may be sent by agent node 120 to manager node 110 include: "GetResponse" and "Trap." "GetResponse" is sent in response to a Get, GetNext, or Set command, and returns information to manager 110. The GetRequest message with one or more object instances asks for the values of those object instances. "Trap" is sent asynchronously or, in other words, upon the occurrence of a predetermined event. Certain traps are predefined by SNMP. Other Traps are "enterprise specific" which means they can be defined to carry information specific to a particular algorithm or service.

SNMP management has two other components in addition to the SNMP messages: the Structure of Management Information (SMI) and the MIB. The SMI is a toolkit for creating a management information base, or MIB. The SMI identifies the permissible data types and spells out the rules for naming and identifying MIB components. It defines the structure of the SNMP naming mechanism. The MIB is a layout or schema for information relevant to managing networks and their component devices. SNMP is most often implemented over IP. However, nothing in the standard prevents SNMP messages from being delivered with TCP, HTTP, or non-Internet protocols, such as IPX or AppleTalk's datagram delivery protocol.

The SMI specifies the allowable data types in the MIB, and it spells out the ways data can be represented. Also, it defines a hierarchical naming structure that ensures unique, unambiguous names for managed objects, which are the components of a MIB. Compared with the objects that general purpose programmers use to build applications, SNMP-managed objects are very simple and stripped-down. MIB objects typically have six or so attributes. For instance, an object usually has a name, such as ifInErrors or tcpAttemptFails; an object identifier in dotted decimal form, such as 1.3.6.1.2.1.2.2.1.14; a syntax field, which selects one of several possible data types such as Integer, IPAddress, or Counter; an access field, which selects among "not-accessible," "read-only," "read-write," and "write-only"; a status field consisting of either "mandatory," "optional," "deprecated," or "obsolete"; and a text description of the object.

MIB objects are static; they're compiled from a text-like description language to a binary form that agents and managing processes can load. MIB-II is the current generic TCP/IP MIB standard, and specific MIBs have been adopted for bridges, printers, and other entities to provide a useful common denominator for management application developers. However, most vendors find it necessary to define their own proprietary objects to take advantage of the capabilities of their own products.

The SMI is two layers of abstraction away from the sort of management data that IT staff and users care about. SMI sets the rules for defining MIB objects, which are one layer of abstraction away from management data. All these abstract rules and reserved words make it possible to have machine-readable specifications that remain comprehensible to humans. The SMI enables a vendor to write an SMI-compliant management object definition, run the text through a standard MIB compiler to create executable code, and install the code in existing agents and in management consoles that could then begin generating reports and charts about such occurrences.

Figure 2:
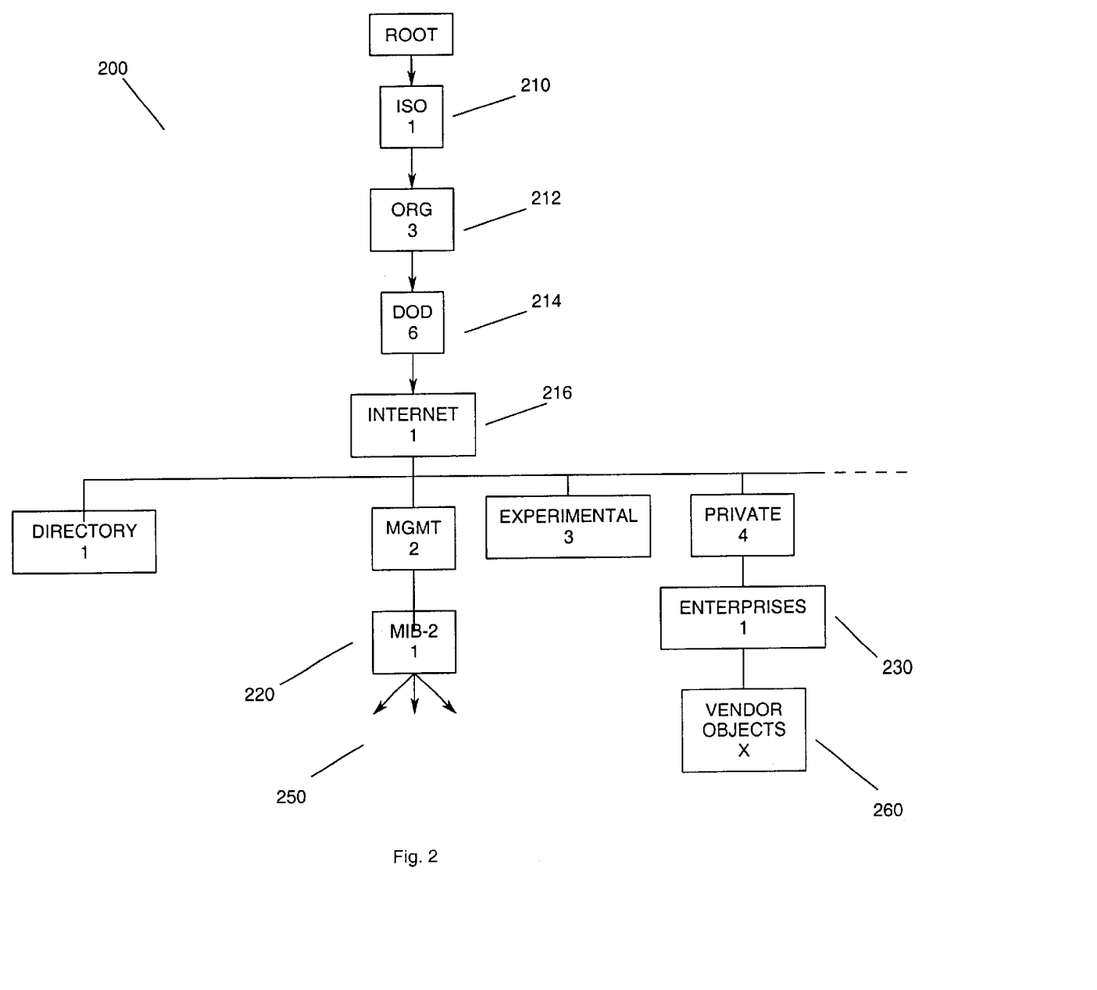
FIG. 2 illustrates the hierarchical name space for the Management Information Base (MIB) structure.

The MIB is a hierarchical name space, with the registration of its nodes administered by the Internet Assigned Numbers Authority (IANA). FIG. 2 illustrates the hierarchical name space for the Management Information Base (MIB) structure. In FIG. 2, the object ID for every relevant MIB object begins with the ISO 1 object identifier 210, National and International Organizations 3 object identifier 212, the Department of Defense 6 object identifier 214, and the Internet Architecture Board 1 object identifier 216. Thus, according to the hierarchy as illustrated in FIG. 2, the object ID for every relevant MIB object must begin with either 1.3.6.1.2.1 (which represents the mib-2 node 220) or 1.3.6.1.4.1 (the enterprises node 230). The term MIB is also used to refer to specific collections of objects used for particular purposes. Thus, MIB objects under the mib-2 node 220 include the RMON (remote monitoring) MIB objects and other generic MIB objects 250, while those under the enterprises node include all proprietary MIB objects 260. It has been estimated that there are at least 10 times as many proprietary MIB objects as there are generic ones.

Each MIB object has a value associated with it according to the syntax part of its specification-for example, the number of packets that have come in since the last system reset, the number of clock ticks since the last reset, or the administrative state of a router. When a MIB object is instantiated on a device or other entity, the value associated with the object is sometimes called a MIB variable. SNMP agents store MIB variables and send them to SNMP managing processes (or consoles) when they are asked to. The value of a MIB variable is the basic unit of useful management information.

MIBs are often divided into groups of related objects. MIB-2 has 10 groups, including "system," "interfaces," "IP," "TCP," "UDP," and "SNMP". The RMON MIB for Ethernet segments has nine groups, including "statistics," "history," "alarm," "event," and "capture".

SNMP managed entities-hubs, routers, database managers, printers, etc.—must be outfitted with an agent that implements all the MIB objects relevant to them. The managing process must also be aware in advance of all the MIB objects implemented on entities it is expected to manage. Management consoles, such as HP OpenView, that communicate with many kinds of devices must allocate incremental resources for each different type of entity-it's no wonder these platforms are resource intensive.

SNMPv2 has been enhanced to include security, improved support for systems and applications management, as well as other extensions. SNMPv2 also enables manager-to-manager communication, and therefore, provides a more distributed management model and makes retrieving tabular data more efficient with a new message type.

For a device that supports SNMP, and supports dynamic information in SNMP, such as a printer supporting a job MIB, the information in the table is very dynamic, as jobs come and go. It is expensive for the SNMP agent in the device to perform conventional GetNext processing on the dynamic information by figuring out which row is "next" after a given row if it is not practical to maintain such information accurately at all times. Thus, the device must look through all possible rows to find the "next" row.

In such a device, the SNMP performance will be poor because the tables are normally accessed by an SNMP client by performing GetNexts through the table, on each column of the table. For a table with n rows and m columns, then, the entire list of possible rows must be gone through (n)×(m) times, simply to support one client getting all the information once. For example, for 50 rows and 10 columns, all 50 rows would be gone through 50×10 times, for a total of 50×50×10=25,000 accesses of row index information, for one single client to retrieve the table information once! Now imagine 10 clients, each of which is going to access the table every 10 seconds.

It can be seen that there is a need for a method and apparatus for improving dynamic simple network management protocol GetNext processing.

SUMMARY OF THE INVENTION

To overcome the limitations in the prior art described above, and to overcome other limitations that will become apparent upon reading and understanding the present specification, the present invention discloses a method and apparatus for improving dynamic simple network management protocol GetNext processing.

The present invention solves the above-described problems by building the "GetNext" list once, then caching that list for a given amount of time.

A method in accordance with the principles of the present invention includes building a GetNext list, storing the GetNext list, maintaining the stored GetNext list for a predetermined amount of time and using the stored GetNext list to determine the next row for a subsequent GetNext request from a first client when the time has not expired.

Other embodiments of a method in accordance with the principles of the invention may include alternative or optional additional aspects. One such aspect of the present invention is that the method further includes refreshing the GetNext list when the time has expired.

Another aspect of the present invention is that stored GetNext list is accessed by a second user client.

Another aspect of the present invention is that the storing includes caching the list in dynamic memory.

Another aspect of the present invention is that the stored GetNext list is implemented as an array.

Another aspect of the present invention is that storing the GetNext list includes storing only row index information.

Another aspect of the present invention is that the method further includes denying return of data for rows that are deleted after the GetNext list is stored.

Another aspect of the present invention is that the method further includes returning an OID reporting a current number of rows in the GetNext list, saving the OID and returning the OID on every access thereafter rather than recomputing the number of rows on each access.

Another aspect of the present invention is that the method further includes returning an OID reporting for each row a number of rows prior thereto.

In another embodiment of the invention, a system controller for managing a device is provided. The system controller includes a dynamic management information base defining objects associated with the device for managing the device, a management agent and device controller for managing operation of the device as defined by the objects with the management information base and a management information base manager, interfacing with the dynamic management information base and the management agent and device controller, for building a GetNext list, storing the GetNext list, maintaining the stored GetNext list for a predetermined amount of time and using the stored GetNext list to determine the next row for a subsequent GetNext request from a first client when the time has not expired.

In another embodiment of the invention, a network system is provided. The network system includes a plurality of network nodes and a network device, wherein the network device includes a system controller for managing a device, the system controller further includes a dynamic management information base defining objects associated with the device for managing the device, a management agent and device controller for managing operation of the device as defined by the objects with the management information base and a management information base manager, interfacing with the dynamic management information base and the management agent and device controller, for building a GetNext list, storing the GetNext list, maintaining the stored GetNext list for a predetermined amount of time and using the stored GetNext list to determine the next row for a subsequent GetNext request from a first client when the time has not expired.

In another embodiment of the invention, a printer is provided. The printer includes a channel for receiving a data stream from a physical connection running a transport protocol stack, an interpreter, coupled to the channel, for converting a description of intended print instances in the data stream into images that are to be marked on print media, an input, output and a marker, the input providing the media to a marker for producing marks on the print media according to the images, the marker providing the printed media to the output and a system controller for implementing control functions for processing the images from the interpreter to the marker, the system controller further includes a dynamic management information base defining objects associated with the printer for managing the device, a management agent and printer controller for managing operation of the printer as defined by the objects with the management information base and a management information base manager, interfacing with the dynamic management information base and the management agent and printer controller, for building a GetNext list, storing the GetNext list, maintaining the stored GetNext list for a predetermined amount of time and using the stored GetNext list to determine the next row for a subsequent GetNext request from a first client when the time has not expired.

In another embodiment of the invention, an article of manufacture including a program storage medium readable by a computer, the medium tangibly embodying one or more programs of instructions executable by the computer to perform a method for improving dynamic simple network management protocol GetNext processing is provided, wherein the method includes building a GetNext list, storing the GetNext list, maintaining the stored GetNext list for a predetermined amount of time and using the stored GetNext list to determine the next row for a subsequent GetNext request from a first client when the time has not expired.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for improving dynamic simple network management protocol GetNext processing. As described above, for a device that supports dynamic information in SNMP, SNMP performance is poor because the tables are normally accessed by an SNMP client by performing GetNexts through the table, on each column of the table. According to the present invention, dynamic information may be supported by building the "GetNext" list once, then caching that list for a given amount of time.

Figure 3:
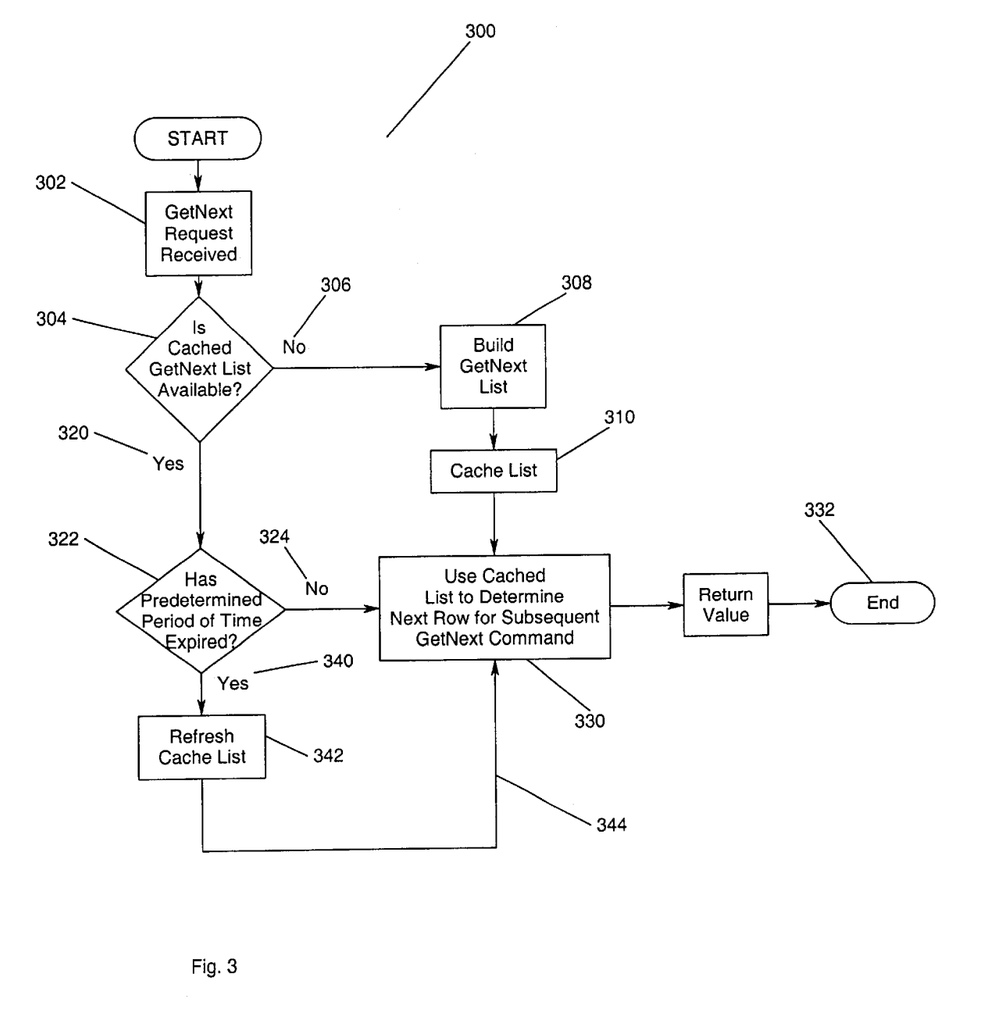
FIG. 3 illustrates a flow chart for improving dynamic simple network management protocol GetNext processing according to the present invention.

FIG. 3 illustrates a flow chart 300 for improving dynamic simple network management protocol GetNext processing according to the present invention. In FIG. 3, a GetNext Request is received 302. A determination is made as to whether a cached GetNext list is available 304. If not 306, a GetNext list is built 308. The built GetNext list is then cached 310. The cached GetNext List is then used to determine the next row for the GetNext request 330 and the value is returned 332.

If a cached GetNext list is available 320, a determination is made as to whether the cached GetNext List has been maintained for a predetermined amount of time 322. If the time has not expired 324, the cached GetNext List is used to determine the next row for subsequent GetNext requests 330 and the value is returned 332.

If the time has expired 340, the cached list must be refreshed 342. The refreshed cached GetNext List is used to determine the next row for subsequent GetNext requests 330 and the value is returned 332.

Thus, the expensive operation of building a list of N rows, in order, is done the first time any client asks for any information in the table (where in the example described above and used for illustration here N=50). From then on, for a certain "small" amount of time, the same GetNext list is used to determine the "next" row. If the entire table could be accessed during the "small amount of time" the cached information is valid, only 50 rows need to be processed to build the list. So 50 accesses of row index information is required rather than 25,000. Moreover, if multiple clients are accessing the table at the same time, they all benefit from the same cached list. For example, if 10 clients access the table at the same time, no more accesses of row index information is required than for a single client. In many cases, the cached list could be made even faster by implementing it as an array.

The "small amount of time" before the cache is refreshed can be chosen based on the speed at which the dynamic information can change and on the accuracy desired. Regarding accuracy, only the GetNext list (a list of SNMP table indices) is cached. Thus, none of the column information is cached. In this way, the column information is always the latest available.

Old rows that are deleted after the GetNext list is cached will be handled accurately because attempts to access information for a specific column for such a row will fail. Thus, the row will not be returned for that column. However, this is normal in SNMP processing. In normal SNMP processing, as a client is stepping through multiple columns of a table, it is possible that different columns will exist for different rows due to the fact that the rows in existence can change during the time between the access of one column and the next.

However, new rows that are added to the MIB after the GetNext list is cached and before the cached list is refreshed are not handled accurately. In other words, they are not returned by GetNext until the cache is refreshed. This is the price paid for the vast improvements in performance the present invention provides. Nevertheless, as mentioned above, since SNMP never guarantees consistent row information anyway, this slight inaccuracy is not a serious drawback.

The cached GetNext list could also be used for other purposes. For example, if there were an OID that reported the current number of rows in the table, that information could be saved when the cache was filled and then returned on every access of the OID, rather than having to recompute it each access. Another example is an OID that reported for each row how many rows were before it. With the cached list, this is easy, but without it, the same processing described above would be necessary, i.e., for each access of this information for each row, all rows would need to be accessed to determine how many are before a given row.

Figure 4:
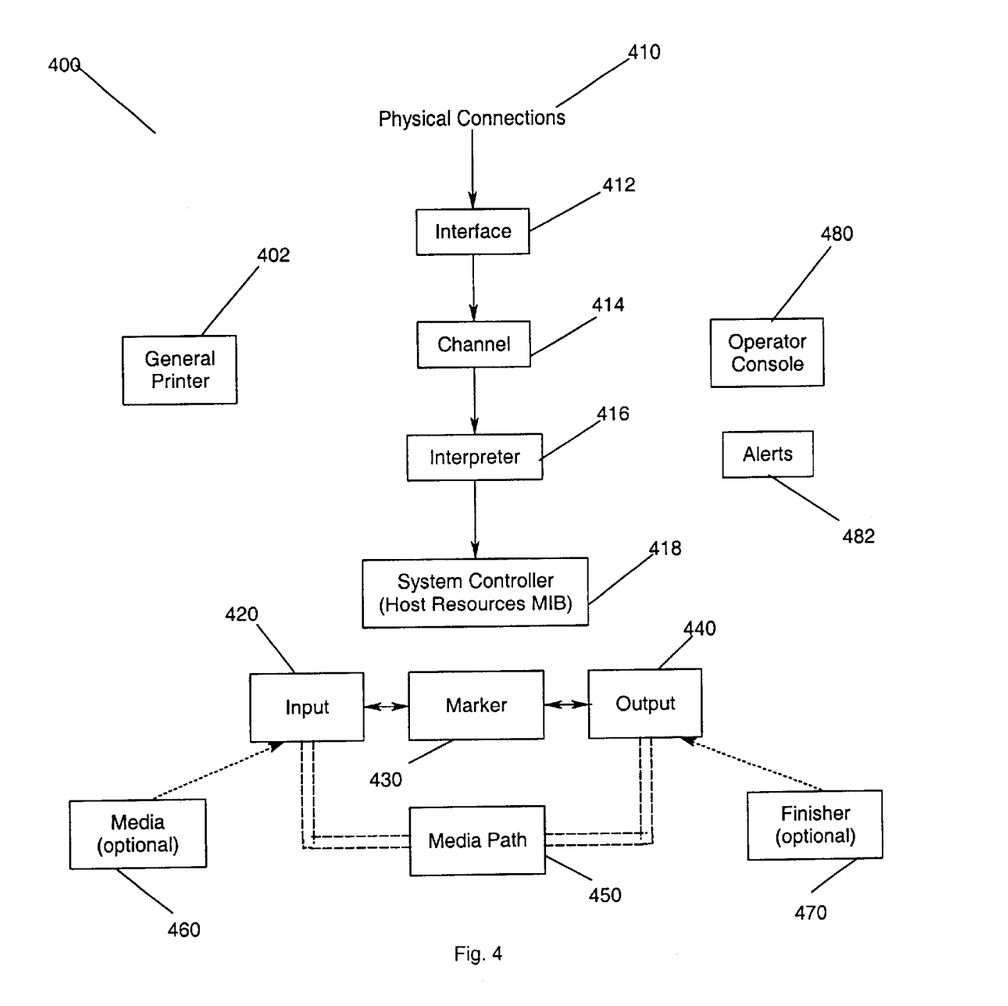
FIG. 4 illustrates a block diagram of a printer according to the present invention.

Dynamic simple network management protocol GetNext processing according to the present invention may be implemented in any SNMP managed entity, e.g., hubs, routers, database managers, printers, etc. By way of example, FIG. 4 illustrates a block diagram of a printer 400, having a system controller which may be implemented with SNMP management according to the present invention. However, those skilled in the art will recognize that the present invention is not meant to be limited to implementation in a printer, but that the present invention may be implemented in any network device that uses a SNMP MIB manager to provide network management services.

FIG. 4 illustrates the three basic functions of the printer: (1) the flow of a print file into an interpreter and onto the marker, (2) the flow of media through the marker and (3) the auxiliary sub-units that control and facilitate the two prior flows. Those skilled in the art will recognize that the sub-units of the printer illustrated in FIG. 4 may not necessarily relate directly to any physically identifiable mechanism. Sub-units can also be a set of definable logical processes, such as interpreters for page description languages or command processors that set various operating modes of the printer.

As shown in FIG. 4, the flow of the print data comes through a physical connection 410 on which some form of transport protocol stack is running to a printer interface 412. The data provided by the transport protocol (interface) appears on a channel 414. The channel 414 provides the data stream to the input to an interpreter 416. The interpreter 416 is responsible for the conversion of a description of intended print instances into images that are to be marked on the media. A printer may have one or more interpreters.

As shown in FIG. 4, the media 460 initially resides in Input sub-units 420 from which the media 460 is selected and then transported via a Media Path 450 first to a Marker 430 and then onto an Output 440 with (optionally) some finishing operations 470 being performed. The Input 420 is a mechanism that feeds media to be marked on into the printer. There may be as many Inputs 420 as there are distinctly selectable input "addresses". The Media 460 is an extension of the Input 420 which represents that media that is in an Input 420. The Output 440 is a mechanism that receives media that has been marked on. A printer may contain one or more Output mechanisms 440. There are as many Outputs 440 as there are distinctly selectable output "addresses". A finisher 470 is a unit that performs some operations on the media other than marking. Some examples of finishing processes are stapling, punching, binding, inserting, or folding.

A Marker 430 is the mechanism that produces marks on the print media. A printer can contain one or more Markers 430. Some examples of multiple marker sub-units 430 are: a printer with separate markers for normal and magnetic ink or an image setter that can output to both a proofing device and final film. Each Marker 430 can have its own set of characteristics associated with it, such as marking technology and resolution. The media paths 450 encompass the mechanisms in the printer that move the media through the printer and connect all other media related units: Inputs 420, Outputs 440, Markers 430 and Finishers 470. A printer may contain one or more media paths 450. In general, the design of the media paths 450 determines the maximum speed of the printer as well as the maximum media size that the printer can handle. Media paths 450 are complex mechanisms and can contain many different identifiable sub-mechanisms such as media movement devices, media buffers, duplex units and interlocks. Not all of the various sub-mechanisms reside on every media path 450. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that multiple copies of the obverse side to be held before the reverse side of all the copies are marked.

The auxiliary sub-units, such as the General Printer 402, Operator Console 480 and Alerts 482, facilitate control of the printer, inquiry/control of the operator panel, reporting of alerts, and the adaptation of the printer to various natural languages and characters sets. The General Printer 402 is responsible for the overall control and status of the printer. The Operator Console 480 is used to display and modify the state of the printer. The console 480 can be as simple as a few indicators and switches or as complicated as full screen displays and keyboards. The Alert unit 482 is responsible for detecting reportable events, making an entry in the alert table and, if and only if the event is a critical event, initiating a trap.

All of the above described functions run on the System Controller 418 which represents the processor, memory and storage systems of the printer. The System Controller 418 implements the control functions for processing a print job. The System Controller 418 includes the MIB, which provides the specification of the processor(s), memory, disk storage, file system and other underlying sub-mechanisms of the printer. The System Controller 418 can range from simple single processor systems to multiprocessor systems. In addition, controllers can have a full range of resources such as hard disks. Those skilled in the art will recognize that a printer may have more than one processor and multiple other resources associated with it.

Figure 5:
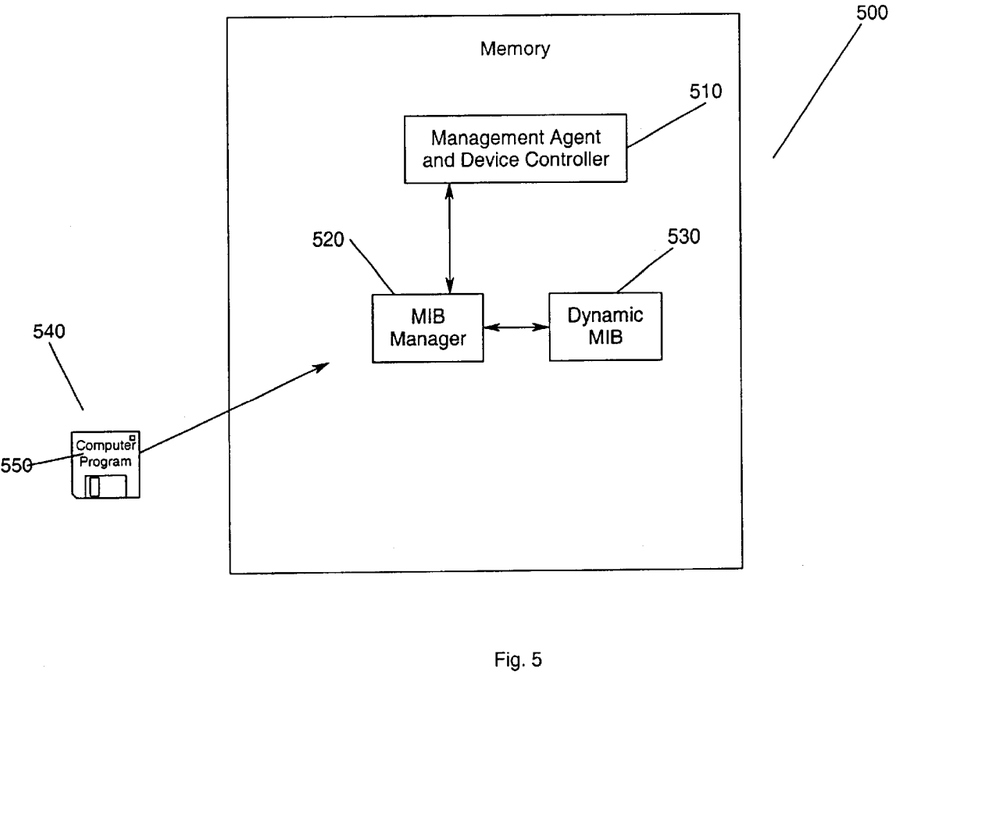
FIG. 5 illustrates a block diagram of the memory which enables dynamic modification according to the process described above with reference to FIG. 3.

Referring now to FIG. 5, a block diagram is shown of the memory 500 which enables dynamic modification according to the process described above with reference to FIG. 3. The memory 500 stores software, routines, procedures, interfaces, semantics, data structures, etc. (collectively referred to as software) in order to manage a network device, such as the printer 400 illustrated in FIG. 4, as well as some or all devices coupled to the network device. The software is executed or otherwise modified by the system controller 418 as illustrated in FIG. 4 to perform the management functions. A main portion of the software is a management agent and device controller (MADC) 510, which includes the primary procedures, routines and drivers. The MADC 510 interfaces with a management information base (MIB) manager 520, which is implemented according to the present invention. The MADC 510 includes executable code for managing operation of the network device as defined by objects with a MIB 530. The MIB manager 520 interfaces and controls a dynamic management information base (MIB) 530 according to the present invention. MIB manager 520 maintains the MIB structure 530 and includes executable code for dynamically modifying the structure of the MIB 530 according to the process described above with reference to FIG. 3. The MIB 530 is a definition of the information about the elements to be managed. The MIB 530 is a tree or list of SNMP data objects, which are identified by an object identifier (OID). The list in the MIB 530 defines the objects that are used to monitor and control the network device. The MIB 530 is preferably implemented entirely in random access memory (RAM) to enable dynamic modification according to the process described above with reference to FIG. 3.

The process illustrated with reference to FIG. 3 may be tangibly embodied in a computer-readable medium or carrier, e.g. one or more of the fixed and/or removable data storage devices 540, or other data storage or data communications devices. The computer program 550 of the storage device 540 may be loaded into the random access memory 500 to configure the MIB manager 520, implemented in the System Controller 418 of FIG. 4, for execution. The computer program 550 comprise instructions which, when read and executed by the MIB manager 520, implemented in the System Controller 418 of FIG. 4, causes the MIB manager 520 to perform the steps necessary to execute the steps or elements of the present invention.

Thus, the present invention provides a method and apparatus for improving dynamic simple network management protocol GetNext processing. The expensive operation of building a list of N rows, in order, is done the first time any client asks for any information in the table. From then on, for a predetermined period of time, the same GetNext list is used to determine the "next" row. During the time the cached list is valid, only N rows need to be processed to build the list. Further savings result if multiple clients access the table at the same time because no more accesses of row index information is required than for a single client.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for improving dynamic simple network management protocol GetNext processing, comprising:
   building a GetNext list;
   storing the GetNext list;
   maintaining the stored GetNext list for a predetermined amount of time; and
   using the stored GetNext list to determine the next row for a subsequent GetNext request from a first client when the time has not expired.

2. The method of claim 1 further comprising refreshing the GetNext list when the time has expired.

3. The method of claim 1 wherein stored GetNext list is accessed by a second user client.

4. The method of claim 1 wherein the storing comprises caching the list in dynamic memory.

5. The method of claim 1 wherein the stored GetNext list is implemented as an array.

6. The method of claim 1 wherein the storing the GetNext list comprises storing only row index information.

7. The method of claim 1 further comprising denying return of data for rows that are deleted after the GetNext list is stored.

8. The method of claim 1 further comprising returning an OID reporting a current number of rows in the GetNext list, saving the OID and returning the OID on every access thereafter rather than recomputing the number of rows on each access.

9. The method of claim 1 further comprising returning an OID reporting for each row a number of rows prior thereto.

10. A system controller for managing a device, comprising:
    a dynamic management information base defining objects associated with the device for managing the device;
    a management agent and device controller for managing operation of the device as defined by the objects with the management information base; and
    a management information base manager, interfacing with the dynamic management information base and the management agent and device controller, for building a GetNext list, storing the GetNext list, maintaining the stored GetNext list for a predetermined amount of time and using the stored GetNext list to determine the next row for a subsequent GetNext request from a first client when the time has not expired.

11. The system controller of claim 10 wherein the management information base manager refreshes the GetNext list when the time has expired.

12. The system controller of claim 10 wherein stored GetNext list is accessed by a second user client.

13. The system controller of claim 10 wherein GetNext list is cached in the dynamic management information base.

14. The system controller of claim 10 wherein the GetNext list is implemented in the dynamic management information base as an array.

15. The system controller of claim 10 wherein the GetNext list comprises only row index information.

16. The system controller of claim 10 wherein the management information base manager denies return of data for rows that are deleted after the GetNext list is stored.

17. The system controller of claim 10 wherein the management information base manager returns an OID reporting a current number of rows in the GetNext list, saves the OID and returns the OID on every access thereafter rather than recomputing the number of rows on each access.

18. The system controller of claim 10 wherein the management information base manager returns an OID reporting for each row a number of rows prior thereto.

19. A network system, comprising:
    a plurality of network nodes; and
    a network device, including a system controller for managing a device, the system controller further comprising:

a dynamic management information base defining objects associated with the device for managing the device;

a management agent and device controller for managing operation of the device as defined by the objects with the management information base; and a management information base manager, interfacing with the dynamic management information base and the management agent and device controller, for building a GetNext list, storing the GetNext list, maintaining the stored GetNext list for a predetermined amount of time and using the stored GetNext list to determine the next row for a subsequent GetNext request from a first client when the time has not expired.

20. A printer, comprising:

a channel for receiving a data stream from a physical connection running a transport protocol stack;

an interpreter, coupled to the channel, for converting a description of intended print instances in the data stream into images that are to be marked on print media;

an input, output and a marker, the input providing the media to a marker for producing marks on the print media according to the images, the marker providing the printed media to the output; and a system controller for implementing control functions for processing the images from the interpreter to the marker, the system controller further comprising:

a dynamic management information base defining objects associated with the printer for managing the device;

a management agent and printer controller for managing operation of the printer as defined by the objects with the management information base; and a management information base manager, interfacing with the dynamic management information base and the management agent and printer controller, for building a GetNext list, storing the GetNext list, maintaining the stored GetNext list for a predetermined amount of time and using the stored GetNext list to determine the next row for a subsequent GetNext request from a first client when the time has not expired.

21. An article of manufacture comprising a program storage medium readable by a computer, the medium tangibly embodying one or more programs of instructions executable by the computer to perform a method for improving dynamic simple network management protocol GetNext processing, the method comprising:

building a GetNext list;

storing the GetNext list;

maintaining the stored GetNext list for a predetermined amount of time; and using the stored GetNext list to determine the next row for a subsequent GetNext request from a first client when the time has not expired.

* * * * *